A. O. DADY.
VALVE AND METHOD OF MAKING THE SAME.
APPLICATION FILED JAN. 2, 1918.
1,294,416.
Patented Feb. 18, 1919.
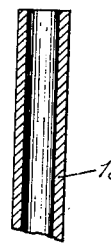
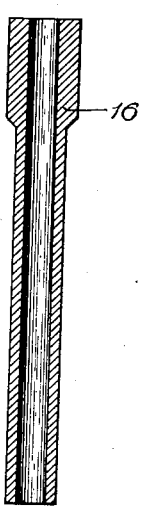
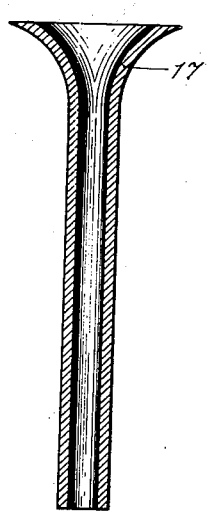
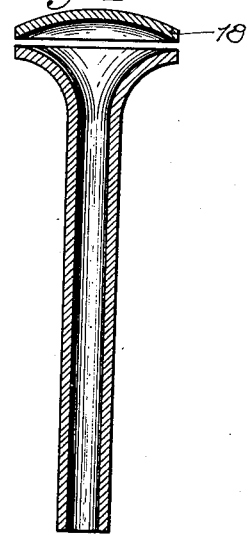
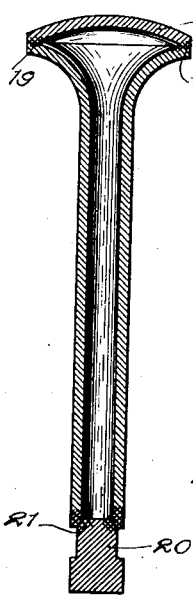
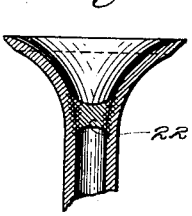
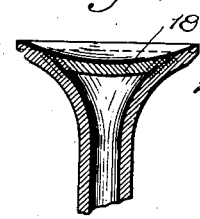
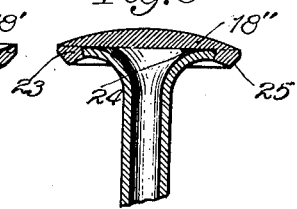
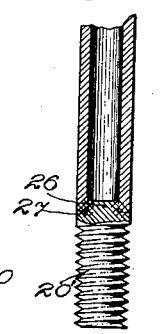
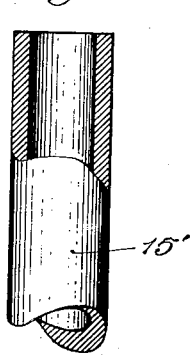
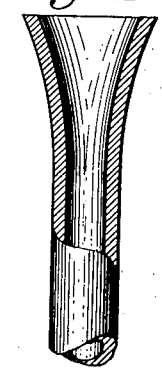
Witnesses:
Inventor
Arthur O. Dady
By Williams, Bradbury & Lee
Attys.

UNITED STATES PATENT OFFICE.

ARTHUR O. DADY, OF NEW YORK, N. Y., ASSIGNOR TO PFANSTIEHL COMPANY, INCORPORATED, OF NORTH CHICAGO, ILLINOIS, A CORPORATION OF NEW YORK.

VALVE AND METHOD OF MAKING THE SAME.

1,294,416.  Specification of Letters Patent.  Patented Feb. 18, 1919.

Application filed January 2, 1918. Serial No. 209,887.

*To all whom it may concern:*

Be it known that I, ARTHUR O. DADY, a citizen of the United States, residing at New York, in the county of New York and State of New York, have invented a certain new and useful Improvement in Valves and Methods of Making the Same, of which the following is a full, clear, concise, and exact description, reference being had to the accompanying drawings, forming a part of this specification.

My invention relates to improvements in valves and the method of making the same. My invention is particularly concerned with the valves intended to be used in internal combustion engines and especially exhaust valves for internal combustion engines.

In making my improved valve I first select a piece of tubing of the desired metal and having a diameter substantially equal to and a length somewhat greater than that of the desired valve. I then upset one end of the tube to thicken the walls thereof and by swaging or other suitable operations flare the thickened portions of the walls outwardly, the excess metal of the thickened walls being used to provide the necessary metal for maintaining the walls of the flared portion of substantially the same thickness as the walls of the tube. If desired I then close the head of the valve by a suitable cap, as will be described later on.

By employing this method of forming the valve stem and the lower portion of the valve head I provide a hollow valve having walls of substantially equal thickness throughout. This method of forming the valve is of advantage for the reason that the entire valve can be given a substantially uniform heat treatment and for the further reason that in operation internal stresses will not be set up by reason of the valve becoming unequally heated due to the valve walls being thinner in some places than in others.

It is also possible by this method of manufacture to provide a so-called tulip valve, that is, one in which the periphery of the valve head is joined with the neck of the stem by a curved surface. Valves of this type are desirable for the reason that they prevent eddying of the gases passing through the valve orifices. With the methods heretofore employed for making valves of this type, however, the weight of the valve is increased to such an extent by the fillet of metal necessary for forming this curved surface that very large additional stresses are placed upon the valve operating mechanism and very heavy springs are required for overcoming the inertia of these heavy valves in quickly moving them to their closed positions. By my method of manufacture valves having very large heads connected with the neck of the valve stem by a curved surface may be manufactured without materially increasing the weight of the valve.

Another advantage of forming a valve by the method described above resides in the fact that there is no joint between the valve head and the stem at the neck of the valve. Inasmuch as the greatest stress upon the valve comes at this point the advantages of this construction will be apparent.

The objects of my invention are then:

1. To provide a valve which is comparatively light but very strong;
2. To provide a valve having walls of uniform thickness;
3. To provide a valve which may be given a uniform heat treatment;
4. To provide a valve of the tulip shaped type without materially increasing the weight of the valve, and
5. To provide an improved process for manufacturing valves of the type described.

Further objects, adaptabilities, and capabilities will appear as the description progresses, reference being had to the accompanying drawings in which:

Figure 1 is a longitudinal section through a piece of tubing employed for making one of my improved valves;

Fig. 2 is a view similar to Fig. 1 but showing the walls at one end of the tube upset to thicken this portion of the tube;

Fig. 3 is a longitudinal section through a valve stem and a portion of the head after the thickened portion of the walls has been swaged outwardly;

Fig. 4 is a view similar to Fig. 3 showing the cap in position above the flared portion of the valve head;

Fig. 5 shows the edges of the cap welded to the flared portion of the valve stem and the lower end of the valve stem closed by means of a plug;

Fig. 6 is a longitudinal section through a valve formed by my improved process showing a modification of the means employed for closing the upper end of the valve stem, the lower portion of the valve stem being broken away;

Fig. 7 is a view similar to Fig. 6 showing another modification of the means for closing the valve stem;

Fig. 8 is another view similar to Fig. 6 and showing a still further modification of the means for closing the valve stem;

Fig. 9 is a partially longitudinal section showing a modified method for securing the plug to the lower end of the valve stem;

Fig. 10 is a partially longitudinal section through a portion of a piece of tubing employed in a modified method of forming the valve stem and head in which method the stem and head are formed from a tube having a diameter intermediate the diameter of the desired head and stem; and Fig. 11 is a view similar to Fig. 10 showing the tube drawn down to form a stem of the desired diameter, the end of the tube being swaged outwardly to form the valve head.

Similar characters of reference refer to similar parts throughout the several views.

In forming my improved valve I first select a piece of tubing 15 having a diameter substantially equal to the diameter of the stem of the desired valve. I then swage one end of the tube to thicken the walls thereof, as indicated at 16 in Fig. 2, the thickened portion diminishing slightly from the end of the tube. By means of swaging operations or in any other suitable manner I then flare the thickened end of the tube outwardly until it assumes a shape substantially similar to that shown at 17 in Fig. 3. This operation absorbs the excess of metal forming the thickened end of the tube and forms a valve head the walls of which are of substantially the same thickness as the walls of the tube. A cap 18 is then punched from suitable stock and the edges thereof are secured to the edges of the flared end of the head, as shown at 19 in Fig. 5. These edges may be secured together either by spot welding or by a suitable fusing operation. The opposite end of the valve stem may, if desired, be closed by means of a plug 20 having a tapered portion 21 fitting in a corresponding counter bore in the end of the valve stem. These portions may likewise be united by spotwelding or brazing, or in any other suitable manner.

In Fig. 6 I have disclosed a modified means for closing the upper end of the valve stem, this means comprising a plug 22 the sides of which are welded or brazed to the adjacent sides of the bore of the valve stem.

In Fig. 7 I have illustrated a cap 18′ which is concaved inwardly and has its edges brazed or welded to the inner side of the valve head.

In Fig. 8 I have shown a still further modification of the means for closing the end of the valve stem which comprises a cap 18″ having a depending flange 23 which surrounds the outer periphery of the flared portion of the valve stem and is secured thereto by means of brazing metal 24, or it may spot welded or fused thereto. This head 18″ may, if desired, be formed from tungsten steel or any other metal having similar characteristics. The lower edge of the periphery of the cap 18″ is beveled, as shown at 25, to provide a suitable face to coact with the valve seat.

In Fig. 9 I have disclosed a modified means for closing the lower end of the valve stem, this means comprising a plug 20′ having a projection 26 fitting snugly within the bore of the tube and a shoulder 27 fitting against the end of the tube. The sides of the projection 26 and the shoulder 27 may be welded or otherwise integrally united with the adjacent portions of the valve stem.

In the modified method of forming my improved valve I start with a piece of tubing 15′ having a diameter intermediate the diameters of the head and stem of the desired valve and by suitable swaging and drawing operations reduce the diameter of the tube to the desired diameter of the valve stem. By this method of forming the valve the strength thereof is increased due to the drawing operation.

The hollow valve produced by the above operations can be especially advantageously employed in high speed internal combustion engines for the reason that it is light and strong, and for the further reason that being hollow it can be easily converted into the "mercury cooled" type of valve by placing a small quantity of mercury in the valve before the lower end thereof is closed by the plug.

While I have described the preferred forms of my improved valve and the methods of making the same, it is to be understood that my invention is not limited to the specific details of either the valve structure or the process of forming the same except by the terms of the appended claims.

Having thus described my invention what I claim as new and desire to secure by Letters Patent of the United States is:

1. A valve comprising a valve stem formed from drawn tubing and having one end thereof flared outwardly to form a portion of the valve head, and a cap having its edges integrally united with the edges of the flared end, the walls of the completed valve being of substantially equal thickness.

2. A valve comprising a hollow valve stem having one end thereof flared outwardly to form a portion of the valve head, and a cap having its edges integrally united with the edges of the flared end, the walls of the completed valve being of substantially equal thickness.

3. A valve comprising a hollow valve stem having one end thereof flared outwardly to form a portion of the valve head, the walls of the completed valve being of substantially equal thickness.

In witness whereof I hereunto subscribe my name this 21st day of December, A. D. 1917.

ARTHUR O. DADY.

Witnesses:
J. E. LOWE,
V. A. DADY.